No. 715,732. Patented Dec. 9, 1902.
H. F. GAREY.
APPARATUS FOR ALTERNATING AIR PRESSURES.
(Application filed Mar. 20, 1902.)
(No Model.)
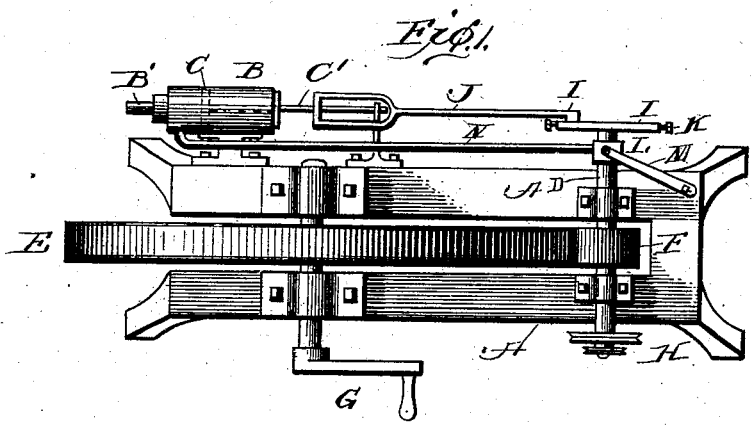
Fig. 1.
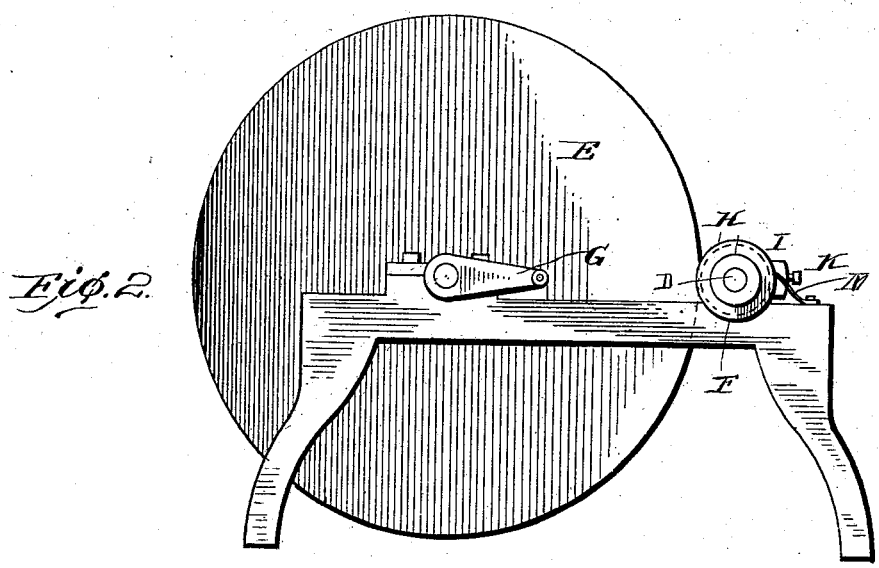
Fig. 2.
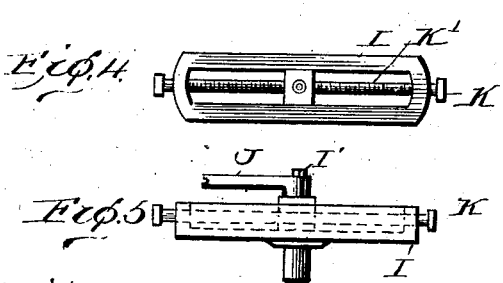
Fig. 4.
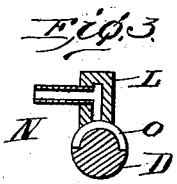
Fig. 3.
Fig. 5.
Witnesses:
J. M. Fowler Jr
Edgar B. McBath
Inventor
Henry F. Garey
by Wallace Greene,
Atty.

UNITED STATES PATENT OFFICE.

HENRY FORCE GAREY, OF BALTIMORE, MARYLAND.

APPARATUS FOR ALTERNATING AIR-PRESSURES.

SPECIFICATION forming part of Letters Patent No. 715,732, dated December 9, 1902.

Application filed March 20, 1902. Serial No. 99,137. (No model.)

*To all whom it may concern:*

Be it known that I, HENRY FORCE GAREY, a citizen of the United States, residing at Baltimore, in the State of Maryland, have invented certain new and useful Improvements in Apparatus for Alternating Air-Pressures; and I do hereby declare the following to be a full, clear, and exact description of the invention, such as will enable others skilled in the art to which it appertains to make and use the same.

My invention relates to apparatus for treating the eye or other portion of the body and involves devices for rapidly alternating in an inclosed space normal atmospheric pressure and a pressure differing from such normal pressure.

One of many embodiments of the invention is illustrated in the accompanying drawings, in which—

Figure 1 is a plan view of the apparatus; Fig. 2, a side elevation; Fig. 3, a detail section; Fig. 4, a face view of a crank-plate, and Fig. 5 an edge view of the devices of Fig. 4.

In the figures, A designates a frame supporting a cylinder B, in which is a plunger C, operated by a plunger-rod C', pitman J, crank-pin I', crank-plate I, and shaft D, the latter rotated in any convenient manner, as by pulleys H or a hand-crank G, acting through friction-wheels E F. The crank-pin is adjustable in distance from the shaft and also from side to side of the latter by means of a screw K K'. From the forward end of the cylinder a passage leads through a pipe N and a block L to the surface of the shaft D, upon which the accurately-fitting block is pressed by a spring M. Beneath the block and in the plane of the end of the passage the shaft is provided with a peripheral groove O of such extent that during alternate strokes of the plunger the passage communicates through the groove with the open air, while during the intermediate and contrary strokes the body of the shaft closes the passage. If the adjustment is such that the passage is closed while the plunger is making a forward stroke, the passage will necessarily be open during the contrary stroke, and continued rotation of the shaft in the same direction will result in a series of compressions in the cylinder alternating with periods of normal or atmospheric pressure, and this will continue so long as this rotation continues without change of adjustment; but if the crank-pin be moved to the other side of the shaft by means of the screw the passage will be open during the forward stroke and closed during the reverse movement, and there will be in the cylinder a series of rarefactions alternating with periods of normal or atmospheric pressure.

I have shown at the outer end of the cylinder a pipe B', and during the operation of the machine this or any extension of it will be closed by pressure against any body to which it may be desired to impart the vibrations of the air within the cylinder. For example, the pipe or any suitable extension thereof may be pressed upon parts surrounding the eye.

It is obvious that the passage leading from the cylinder to the shaft is not necessarily in a pipe distinct from the frame, nor the block necessarily distinct from the bearings of the shaft, nor non-integral with the pipe, nor held against the shaft by the means shown, and that in various other ways the construction might be varied without passing beyond the proper limits of my invention.

What I claim is—

The combination with the cylinder and plunger therein, of the rotary shaft carrying the crank-plate and crank-pin adjustable from side to side of the shaft and connected with the plunger, and a conduit leading from the forward end of the cylinder to the surface of said shaft, said shaft having at the point where it is met by the conduit a form adapting it to alternately open and close the conduit as the shaft rotates, substantially as set forth.

In testimony whereof I affix my signature in presence of two witnesses.

HENRY FORCE GAREY.

Witnesses:
SAMUEL J. FISHER,
HENRIETTA WHITEHILL.